United States Patent Office 3,086,243
Patented Apr. 23, 1963

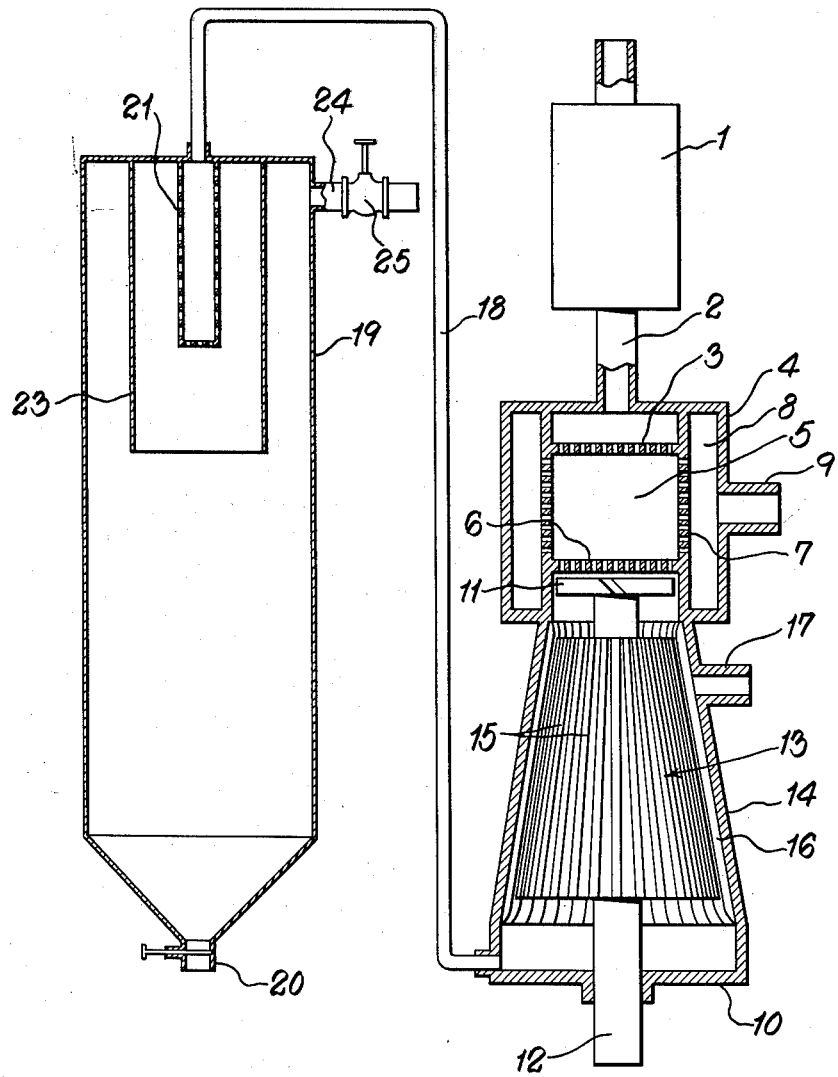

3,086,243
PROCESS AND APPARATUS FOR CONTINUOUSLY
WASHING HIGHLY VISCOUS MASSES
Eduard Bergmeister, Rupprecht Fritzweiler, Heribert
Schwarz, and Hans Wimmer, all of Burghausen, Upper
Bavaria, Germany, assignors to Wacker-Chemie
G.m.b.H., Munich, Germany, a corporation of Germany
Filed Dec. 20, 1960, Ser. No. 77,141
Claims priority, application Germany Dec. 30, 1959
11 Claims. (Cl. 18—1)

This invention relates to continuously washing highly viscous masses and it has for its object to provide a novel and improved process and apparatus for this purpose.

Another object of the invention is to reduce the cost of removing noxious impurities from highly viscous materials by washing, and at the same time improve the quality of the purified product, by minimizing the washing period and consequently the time during which said materials are subjected to high temperatures.

Still another object is to provide a continuous washing apparatus of the type specified, having novel and improved details of construction and features of operation.

Various other objects and advantages will be apparent as the nature of the invention is more fully disclosed.

For certain purposes, for instance for the manufacture of tasteless and odorless highly viscous materials, it is necessary to remove noxious impurities from such materials. In order to achieve this, it is customary to subject the raw products to distillation, for instance vacuum distillation, high-vacuum distillation or steam distillation. Attempts have also been made to remove the impurities by washing the high viscosity masses in hot water. However, these methods as previously practiced are not satisfactory because they either do not completely remove the noxious impurities, or else the process must be repeated so often that the economic feasibility of the method becomes highly questionable.

We have now discovered a process for continuously washing, at elevated temperatures, highly viscous masses and especially highly polymerized organic substances whose viscosity at the washing temperature amounts to $10^2$–$10^5$ poise (the c.g.s. unit of viscosity). Our process in its preferred form is characterized by the fact that the highly viscous mass, preheated and finely dispersed by known methods, is treated preferably under a pressure of 5–30 atmospheres in free flow with a hot washing fluid which does not appreciably dissolve the high viscosity material but is a solvent for the impurities, and, after further intimate mixing with the washing fluid, the viscous material is separated from the washing fluid under reduced pressure or the same pressure.

The invention will be described in connection with the accompanying drawing which is a diagrammatic illustration of an apparatus embodying the invention.

The process of the invention is carried out as follows: after complete polymerization a highly viscous mass, for example polymerized vinyl acetate, is added to the washing fluid (such as water) and thus a suspension is created which, in a typical case, is fed into a pump such as the gear pump 1 in a heated state. The pump 1 can be heated in any suitable manner, not shown. The suspension is pumped through pipe 2 and is pressed through the perforated horizontal plate 3 adjacent the top of a cylindrical casing 4 which we call a nozzle head. The suspension is pressed through the perforated plate 3 in the form of fine extruded threads, into an interior mixing chamber 5 of nozzle head 4. Nozzles can be used instead of the perforated plate 3, with the same result.

In the embodiment illustrated, the interior mixing chamber 5 of nozzle head 4 is defined by the above-mentioned upper horizontal perforated plate 3, a lower horizontal perforated plate 6 spaced from said plate 3, and a cylindrical perforated side wall 7. The outer cylindrical wall of nozzle head 4 is spaced from the cylindrical perforated wall 7, thus forming an annular space 8 to which is connected an inlet pipe 9 to admit hot washing fluid at any suitable temperature.

The washing fluid, for instance hot water under pressure, entering the annular space 8 from inlet pipe 9, is pressed through the perforated wall 7 into the interior mixing chamber 5 concentrically and in a direction perpendicular to the downward flow of the suspension entering through the perforated plate 3. Said washing water, heated at least up to the temperature of the suspension, and under a pressure of 5–30 atm., has a high input velocity.

The lower end of the nozzle head 4, below the lower horizontal perforated plate 6, is connected to the enclosed emulsifier 10. Since the smooth uninterrupted operation of the washing plant and the washing results achieved with highly viscous masses, particularly with those which are hard to emulsify, depends to a great extent on the degree of mixing of the mass with the washing medium at the entrance into the emulsifier, care must be taken to see that no separation occurs before entrance into the emulsifier 10. This can be achieved, for instance, by mounting a cutter 11 on the upper end of the rotary shaft 12 which carries the truncated conical rotor 13 inside the conical casing of the emulsifier.

The rotating cutter 11, being directly beneath the lower horizontal perforated plate 6 of mixing chamber 5, cuts the mixed mass of material which emerges in the form of threads from said perforated plate 6. When the speed of the rotor 13 is about 2800 r.p.m. the cutter 11 creates a very intensive mixture even if, through unforeseen circumstances, separation should take place prematurely in the nozzle head 4 and the separated material emerge into the distributor space above the emulsifier 10.

Since by the means so far described the highly viscous mass has already been loosened up considerably and the first phase of the washing process has been attained, the mixture of the highly viscous mass and the washing fluid, evenly distributed by the lower perforated plate 6, emerges into the small end of the emulsifier 10. The emulsifier consists of the truncated conical rotor 13 mounted on the shaft 12 within the truncated conical casing or housing 14. The rotor 13 has elongated sharp-edged blades or fins 15 on its conical surface, and the adjacent inner conical surface of housing 14 has sharp-edged blades or fins 16. There is only a uniform narrow restricted annular space between the rotor and the casing, said flared annular space, of course, increasing in circumference from the inlet end to the discharge end of the emulsifier.

The mixture of highly viscous material and washing liquid passing through the narrow cross-section of the annular space between the rotor and casing of the emulsifier is mixed so intensively by fins 15 and 16, with the rotor turning at 2800 r.p.m., that a surprisingly thorough washing action takes place. The cross-section of this annular space, and thus the speed of passage of the mixture therethrough, may be varied or adjusted, for example by substituting a rotor of different size for the rotor 13 illustrated in the drawing, according to the amount and kind of impurities and the viscosity of the material to be treated. If necessary, at this stage additional washing fluid can be introduced through pipe 17 leading into the restricted annular space between rotor 13 and housing 14 adjacent the small end thereof.

The intimate mixture of highly viscous material and washing fluid passes out from the lower end of emulsifier 10 through a conduit or pipe 18 which leads to the top center of separator 19. This separator 19 is an elongated upright cylinder having a discharge opening 20 at the bottom which may be closed by a suitable gate or cover at the start of the process and kept closed until the separator fills. The mixture passes from pipe 18 into a jet tube or nozzle 21 of restricted size which has a multiplicity of holes in its cylindrical wall and in its lower end, and from there it passes with reduced speed into a concentric cylindrical baffle or tunnel 23 which extends well below the bottom of tube 21, and thence into the lower part of the separator 19.

The mixture entering the separator 19 piles up in the jet tube 21. Aided by the separation which has already started in the feed pipe 18, the washed highly viscous mass becomes concentrated or compacted in jet tube 21. The washed product emerges in strands or threads from the jet tube 21 into the tunnel 23 and falls down into the lower part of the separator 19, while the washing fluid (in this example water) accumulates in the upper part of the separator and flows out through a pipe 24 which contains a suitable discharge valve or regulator 25. The initial high emerging speed is gradually reduced through tunnel 23 into the main body of the separator 19, so that whirling up of the washed product in the lower part of the separator and rising up of the product to the pipe 24 is prevented. By proper adjustment of the valve 25 at the washing fluid outlet pipe 24, the pressure on the washed highly viscous mass, and therefore its level in the separator 19 can be regulated at will.

In this manner a perfect continuous separation is achieved. If necessary, the washed highly viscous mass can be put through the washing cycle more than once, although usually it can be utilized directly after a single passage through the apparatus. The advantage of the process lies in the fact that the washing of the highly viscous mass can be effected continuously, and it is possible, in instances where the mass contains particularly resistant impurities, to keep the mass moving through the cycle until the desired degree of purification has been attained. The surprisingly high efficiency after a single passage is achieved because every part of the treated material is brought into contact with the washing fluid evenly and by compulsion rather than by mere chance. This makes it possible to shorten the washing time decisively. Furthermore, in spite of the short washing period stable products are obtained which, for instance, in the case of polyvinyl acetate, can easily stand a subsequent tempering (1 hour at 160° C.).

An important advance over the prior art is further evident from the fact that with our process and apparatus it is possible to reduce the residual moisture of the purified product to about 20–30%. This again shortens the distilling period for the removal of the residual moisture considerably. Due to the shortened washing period the temperature stress of the highly viscous mass is also considerably reduced, with the result that saponification reactions and discolorations, which took place in previous processes, are avoided.

Another example of the use of the invention is its application to purifying an ethylene-propylene copolymerizate produced by a Ziegler catalyst. In this case no gear pump 1 is required because the masss is propelled forward by the autoclave pressure. This example is described below.

*Example 1*

In this instance the holes in the perforated plate 6 were replaced by nozzles. The highly viscous mass is pressed from the polymerizing autoclave through capillary tubes into the nozzle head at a temperature of about 70° C. with a pressure of 10 atm., and it is mixed in the mixing chamber 5 with alcohol admitted through inlet pipe 9 and the perforated wall 7. The polymer is finely distributed by the cutter 11, and in the emulsifier 10 it is mixed intimately with alcohol, so that after one passage the polymer is completely degasified and the catalyst is completely decomposed. The soft, flaky product is separated from the liquid in the separator 19, pressed and dried. However, a suction filter or the like can be used here instead of the separator 19. The fibrous polymer product is free of noxious catalyst residues after this single passage. It is free from the trapped gas, and due to its structure it can be handled easily. On the other hand, when such a polymer is mixed with alcohol according to previously known processes, for instance in fast-turning mixers or mixing pumps, the yield is a plastic product in large chunks containing gas, which cannot practically be freed from its residual catalyst, and due to its structure it cannot be processed any further.

*Example 2*

After completed polymerization, polyvinyl acetate is mixed with boiling water and conveyed to the gear pump 1 at a temperature from 90 to 95° C. The mixture is carried through pipe 2 and is pressed in fine threads through the perforated plate 3 into the interior of the nozzle head 4. Through the apertured wall 7 of the nozzle head 4, at right angles to the direction of flow of the suspension, water is forced in concentrically at a temperature of about 90° C. and under a pressure of 7 atm. After the suspension is loosened up by the cutter 11, the mass passes through the lower perforated plate 6 into the attached emulsifier 10 in which it is mixed intensively, and during this process more hot water can be added, if necessary, as explained above. The intimate mixture of polyvinyl acetate and water is conveyed into the separator 19 and from there into the baffle 23 where it is separated from the fluid, and subsequently it is pressed out and dried as previously explained.

*Example 3*

In the setup of Example 2 a mixture of a polymerizate like a soft resin, consisting of 70 parts vinyl acetate and 30 parts vinyl laurate is washed. After an equally short washing time the result is a stable product, practically free of impurities, which is excellently suited for making chewing gum. Applied pressure: 5 atm.

*Example 4*

In a manner analogous to Example 3, a mixed polymerizate of vinyl acetate-dibutyl maleate (60:40) or a homopolymerizate of the vinyl propionate is washed with the same result, in an equally short time, free of impurities. Applied pressure: 6 atm.

*Example 5*

A melt of low-viscosity polyvinyl acetate and dibutyl phthalate (90:10) is washed in the apparatus of Example 2 with good results. The mass is circulated twice. Applied pressure: 5 atm.

*Example 6*

Analogously with Example 1, a polyethylene produced with a Ziegler catalyst is washed with isopropanol and comminuted. Polypropylene can be treated in the same manner. Applied pressure: 28 atm.

*Example 7*

A silicon resin which has been condensed in the usual manner from chlorsilanes in the presence of water is separated from the aqueous hydrochloric acid, and then it is washed with a twelvefold excess of water as per the arrangement of Example 2. The resin was completely free of any hydrochloric acid after drying. Applied pressure: 10 atm.

*Example 8*

In the arrangement of Example 2, raw gum arabic is washed with a fivefold quantity of methanol at about 60° C. in circulation. The washed product, unlike the raw gum arabic, is very well suited as an emulsifier during the emulsion polymerization of vinyl acetate, for instance. Applied pressure: 5 atm.

Example 9

A waxy, more highly condensed aminocrotonic acid ester which also contains an excess of about 10% of higher fatty alcohols, is washed as per the arrangement in Example 2 with twice the amount of isopropanol, at 40° C. The product accumulates in the separator in the form of fine grains which can easily be filtered; the crystalline ester is practically free of fatty alcohols. Applied pressure: 8 atm.

The invention claimed is:

1. Process for continuously washing highly viscous materials which comprises flowing such material in a highly viscous state under pressure into and out of an enclosure in the form of threads, introducing a washing liquid into said enclosure in a direction perpendicular to the direction of flow of said material and mixing same with the material therein, feeding the mixed material from said enclosure through a restricted space while subjecting said material to intensive mixing within said space, discharging the mixed material from said restricted space, and separating the washing liquid from said discharged mixed material.

2. Process for continuously washing high polymer organic materials whose viscosity is $10^2$–$10^5$ poise at the washing temperature, which comprises flowing such material at a pressure of 5–30 atm. into and out of an enclosure in the form of fine threads, introducing a washing liquid into said enclosure in a direction perpendicular to the direction of flow of said material to mix said liquid with said material within said enclosure, said washing liquid being a non-solvent for said material but being a solvent for impurities contained in said material, continuously severing the fine threads of mixed material flowing out of said enclosure, feeding said severed material through a restricted conical space of annular cross-section from the small end to the large end thereof while subjecting said material to intensive mixing within said space, discharging the mixed material from said conical space, and separating the washing liquid from said discharged material.

3. Process according to claim 2, in which additional washing liquid is admitted directly into said restricted conical space adjacent the small end thereof for admixture with the material being mixed in said space.

4. Apparatus for continuously washing highly viscous materials comprising a mixing chamber having perforated top and bottom walls, means for continuously feeding a material in a highly viscous state downwardly under pressure into said mixing chamber through the perforated top wall thereof and thence in the form of strings through the perforated bottom wall thereof, means for feeding a washing liquid under pressure into said mixing chamber in a direction perpendicular to the direction of movement of said highly viscous material in said chamber and means for recovering from said washing liquid said material in said highly viscous state issuing from said mixing chamber.

5. Apparatus for continuously washing highly viscous materials comprising a casing, a mixing chamber in said casing having perforated top and bottom walls and a perforated side wall which is spaced from said casing, means for continuously feeding a highly viscous material downwardly under pressure into said mixing chamber through the perforated top wall thereof and thence in the form of strings through the perforated bottom wall thereof, means for feeding a washing liquid under pressure into the space between said casing and said side wall and thence through said side wall into said mixing chamber for admixture with said highly viscous material, an emulsifier including a truncated conical housing having its small end communicating with the perforated bottom wall of said mixing chamber to receive the mixed material extruded therethrough, a truncated conical rotor in said housing separated from the latter by an annular space having its large end opening into the bottom of said housing, means for severing the mixed material extruded through the perforated bottom wall of said mixing chamber, means on the adjacent conical surfaces of said rotor and said conical housing for intensively mixing the severed material fed through said annular space, and means for discharging mixed material from the bottom of said emulsifier.

6. Apparatus for continuously washing highly viscous materials comprising a cylindrical casing, a mixing chamber in said casing having perforated top and bottom walls and a perforated cylindrical side wall which is separated from the cylindrical part of said casing by an annular space, means for continuously feeding a highly viscous material downwardly under pressure into said mixing chamber through the perforated top wall thereof and thence in the form of strings through the perforated bottom wall thereof, means for feeding a washing liquid under pressure into said annular space and thence through said cylindrical side wall into said mixing chamber for admixture with said highly viscous material, an emulsifier including a truncated conical housing having its small end communicating with the perforated bottom wall of said mixing chamber to receive the mixed material extruded therethrough, a truncated conical rotor in said housing separated from the latter by an annular space having its large end opening into the bottom of said housing, means for severing the mixed material extruded through the perforated bottom wall of said mixing chamber, means on the adjacent conical surfaces of said rotor and said conical housing for intensively mixing the severed material fed through said annular space, means for admitting additional washing liquid into said restricted annular space adjacent the small end thereof, means for discharging mixed material from the bottom of said emulsifier, and means for separating liquid from said discharged material.

7. Apparatus for continuously washing highly viscous materials comprising a cylindrical casing, a mixing chamber in said casing having perforated top and bottom walls and a perforated cylindrical side wall which is separated from the cylindrical part of said casing by an annular space, means for continuously feeding a highly viscous material downwardly under pressure into said mixing chamber through the perforated top wall thereof and thence in the form of strings through the perforated bottom wall thereof, means for feeding a washing liquid under pressure into said annular space and thence through said cylindrical side wall into said mixing chamber for admixture with said highly viscous material, an emulsifier including a truncated conical housing having its small end communicating with the perforated bottom wall of said mixing chamber to receive the mixed material extruded therethrough, a truncated conical rotor in said housing separated from the latter by an annular space having its large end opening into the bottom of said housing, a rotatable cutter between the upper small end of said rotor and the perforated bottom wall of said mixing chamber to sever the mixed material extruded through the latter, means on the adjacent conical surfaces of said rotor and said conical housing for intensively mixing the severed material fed through said annular space, and means for discharging mixed material from the bottom of said emulsifier.

8. Apparatus for continuously washing highly viscous materials comprising a vertical cylindrical casing, a mixing chamber in said casing having horizontal perforated top and bottom walls and a perforated cylindrical side wall which is separated from the cylindrical portion of said casing by an annular space, means for continuously feeding a highly viscous material downwardly under pressure into said mixing chamber through the perforated top wall thereof and thence in the form of strings through the perforated bottom wall thereof, means for feeding a washing liquid under pressure into said annular space and thence through said cylindrical side wall into said mixing chamber for admixture with said highly viscous material, an emulsifier including an enclosed truncated conical housing having its small end communicating with the perforated bottom wall of said mixing chamber to receive the mixed material extruded therethrough, a truncated conical rotor in said housing separated from the latter by a restricted uniform annular space having its large end opening into the bottom of said housing, a rotary cutter rotatable with said rotor between the upper small end of said rotor and the perforated bottom wall of said mixing chamber to sever the mixed material extruded through the latter, sharp-edged mixing blades on the adjacent conical surfaces of said rotor and said conical housing projecting into said restricted annular space for intensively mixing the severed material fed through said annular space, means for admitting additional washing liquid into said restricted annular space adjacent the small end thereof, and means for discharging mixed material from the bottom of said emulsifier.

9. Apparatus for continuously washing highly viscous materials comprising a casing, a mixing chamber in said casing having perforated top and bottom walls and a perforated side wall which is spaced from said casing, means for continuously feeding a highly viscous material downwardly under pressure into said mixing chamber through the perforated top wall thereof and thence in the form of strings through the perforated bottom wall thereof, means for feeding a washing liquid under pressure into the space between said casing and said side wall and thence through said side wall into said mixing chamber for admixture with said highly viscous material, an emulsifier including a truncated conical housing having its small end communicating with the perforated bottom wall of said mixing chamber to receive the mixed material extruded therethrough, a truncated conical rotor in said housing separated from the latter by an annular space having its large end opening into the bottom of said housing, means for severing the mixed material extruded through the perforated bottom wall of said mixing chamber, means on the adjacent conical surfaces of said rotor and said conical housing for intensively mixing the severed material fed through said annular space, a separator including a cylinder having a discharge opening at the bottom, means for feeding the mixed material under pressure from the lower end of said emulsifier into the top center of said separator, a perforated tube on the top center of said separator connected to said feeding means whereby said mixed material is extruded through said perforated tube into said separator, a concentric cylindrical baffle surrounding said perforated tube and extending into said separator below the bottom of said perforated tube, and means for discharging liquid from the top of said separator.

10. Apparatus for continuously washing highly viscous materials comprising a casing, a mixing chamber in said casing having perforated top and bottom walls and a perforated side wall which is spaced from said casing, means for continuously feeding a highly viscous material downwardly under pressure into said mixing chamber through the perforated top wall thereof and thence in the form of strings through the perforated bottom wall thereof, means for feeding a washing liquid under pressure into the space between said casing and said side wall and thence through said side wall into said mixing chamber for admixture with said highly viscous material, an emulsifier including a truncated conical housing having its small end communicating with the perforated bottom wall of said mixing chamber to receive the mixed material extruded therethrough, a truncated conical rotor in said housing separated from the latter by an annular space having its large end opening into the bottom of said housing, means for severing the mixed material extruded through the perforated bottom wall of said mixing chamber, means on the adjacent conical surfaces of said rotor and said conical housing for intensively mixing the severed material fed through said annular space, means for admitting additional washing liquid into said restricted space adjacent the small end thereof, a separator including an elongated upright cylinder having a discharge opening at the bottom, means for feeding the mixed material under pressure from the lower end of said emulsifier into the top of said separator, a perforated tube on the top center of said separator connected to said feeding means whereby said mixed material is extruded through said perforated tube into said separator, a concentric cylindrical baffle surrounding said perforated tube and extending into said separator below the bottom of said perforated tube, and means for discharging liquid from the top of said separator.

11. Process for continuously washing highly viscous materials which comprises extruding such material into and out of an enclosure in the form of finely distributed strands under a pressure of 5–30 atmospheres, flowing a washing fluid at a temperature of 40–90° C. through said enclosure in intimate admixture with said material and in a direction perpendicular to the direction of flow of said material, continuously severing the finely distributed strands of material extruded out of said enclosure, feeding said severed material through a restricted conical space from the small end to the large end thereof while subjecting said material to intensive mixing within said space, discharging the mixed material from said conical space, and separating the washing fluid from said discharged material.

References Cited in the file of this patent
UNITED STATES PATENTS

| | | |
|---|---|---|
| 1,885,283 | Ostermann | Nov. 1, 1932 |
| 2,162,778 | Kent | June 20, 1939 |
| 2,179,985 | Stoeckly | Nov. 14, 1939 |
| 2,371,722 | Wanderer | Mar. 20, 1945 |
| 2,433,045 | Hamilton | Dec. 23, 1947 |